Figure 1:
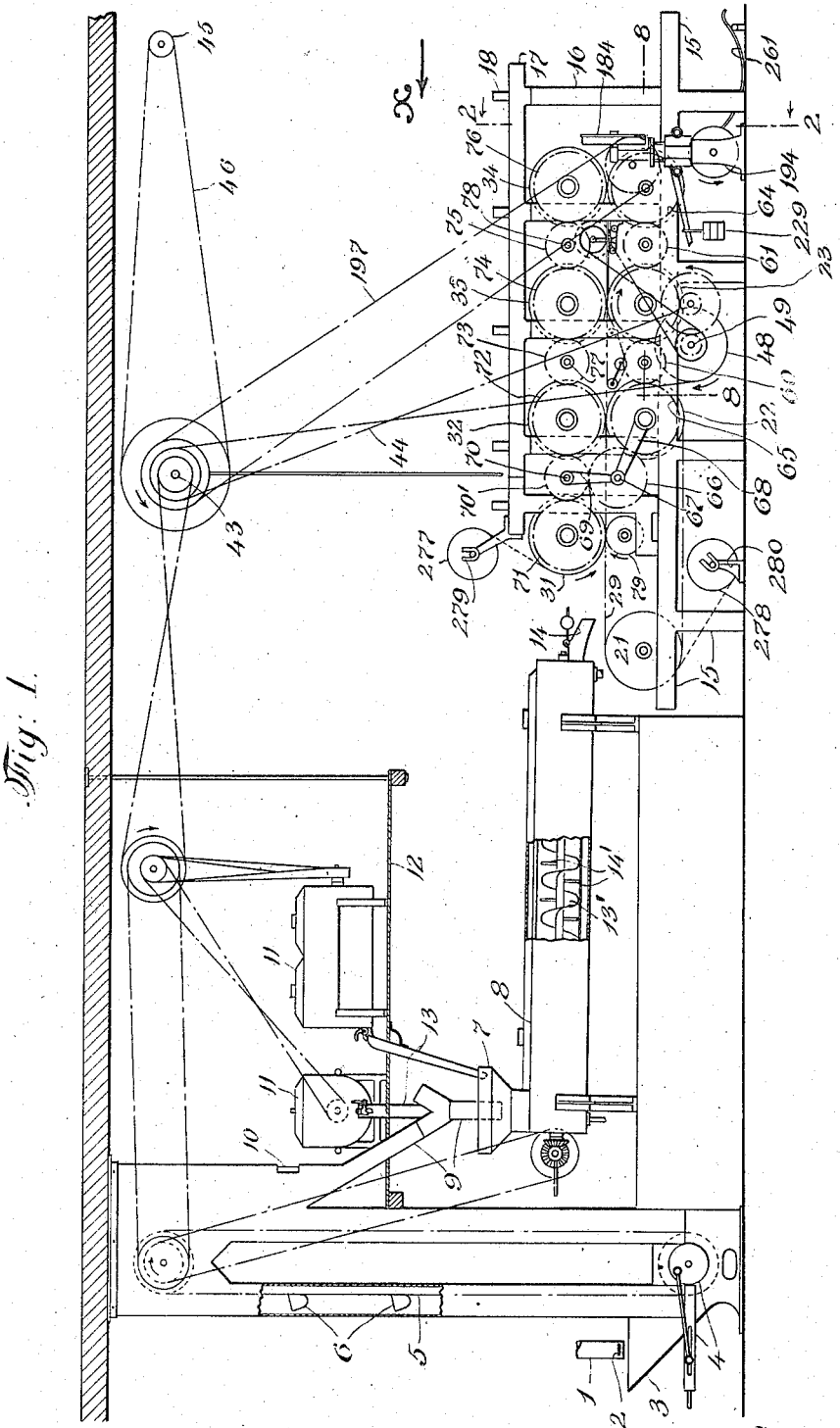

A. H. BIERTUEMPFEL.
COMPOSITION CORK COMPRESSOR.
APPLICATION FILED JULY 20, 1912.

1,128,840.

Patented Feb. 16, 1915.
12 SHEETS—SHEET 1.

Witnesses:
Harry E. Pfeiffer
Fredk. H. W. Fraentzel

Inventor
Albert H. Biertuempfel,
By his Attorneys,
Fraentzel and Richards

A. H. BIERTUEMPFEL.
COMPOSITION CORK COMPRESSOR.
APPLICATION FILED JULY 20, 1912.

1,128,840.

Patented Feb. 16, 1915.
12 SHEETS—SHEET 2.

Witnesses:
Harry K. Pfeiffer
Fredk. W. Fraentzel

Inventor
Albert H. Biertuempfel
By his Attorneys
Fraentzel and Richards

A. H. BIERTUEMPFEL.
COMPOSITION CORK COMPRESSOR.
APPLICATION FILED JULY 20, 1912.

1,128,840. Patented Feb. 16, 1915.
12 SHEETS—SHEET 3.

Witnesses:
Harry E. Pfeiffer
Fredk. W. Fraentzel

Inventor
Albert H. Biertuempfel,
By his Attorneys
Fraentzel and Fraentzel.

A. H. BIERTUEMPFEL.
COMPOSITION CORK COMPRESSOR.
APPLICATION FILED JULY 20, 1912.

1,128,840.  Patented Feb. 16, 1915.
12 SHEETS—SHEET 4.

Witnesses:
Harry E. Pfeiffer
Fred'k W. Fraentzel

Inventor
Albert H. Biertuempfel
By his Attorneys
Fraentzel and Richards

A. H. BIERTUEMPFEL.
COMPOSITION CORK COMPRESSOR.
APPLICATION FILED JULY 20, 1912.

1,128,840.

Patented Feb. 16, 1915.
12 SHEETS—SHEET 8.

Witnesses:
Harry E. Pfeiffer
Fredk. W. Fraentzel

Inventor
Albert H. Biertuempfel
By his Attorneys
Fraentzel and Richards

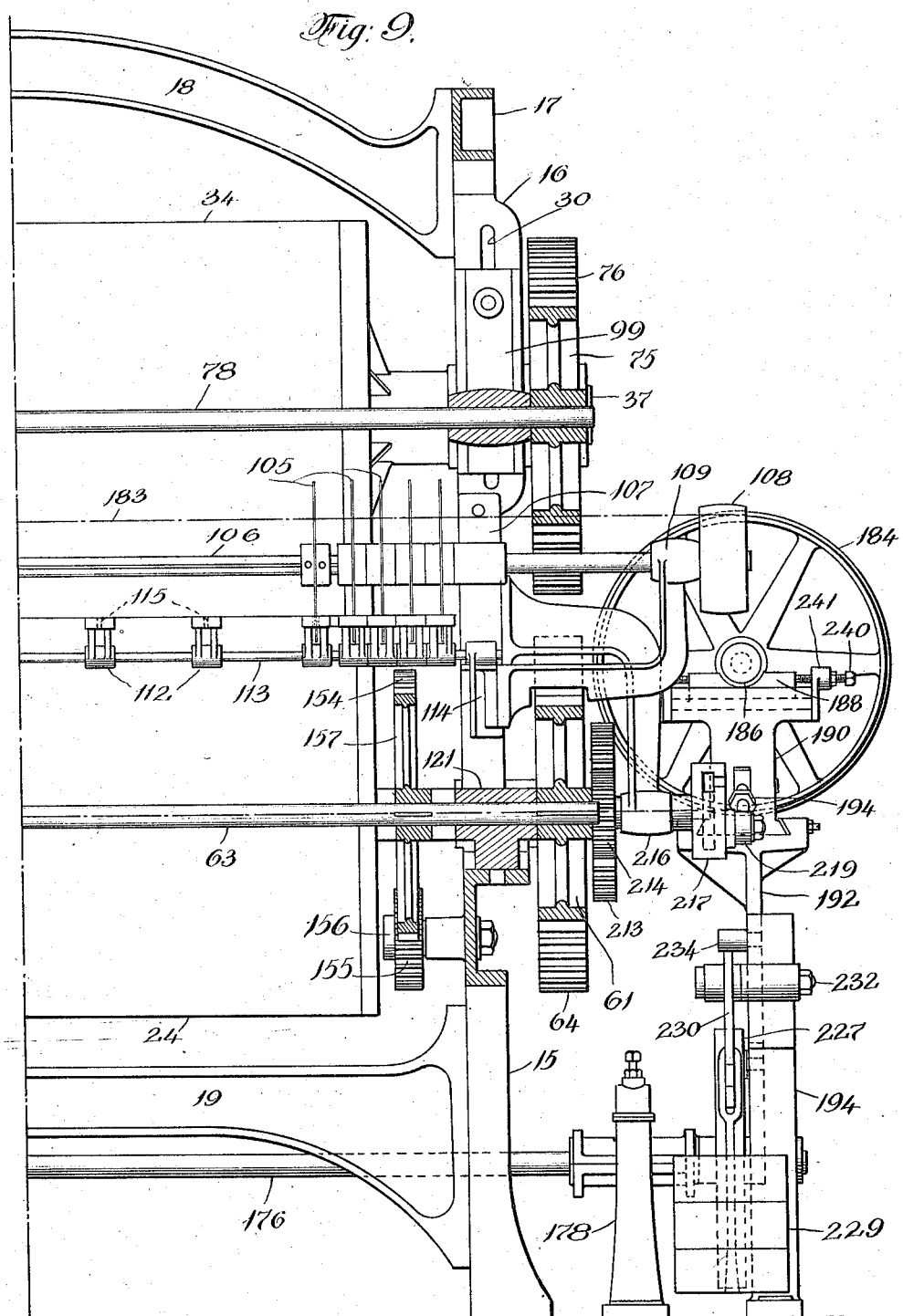

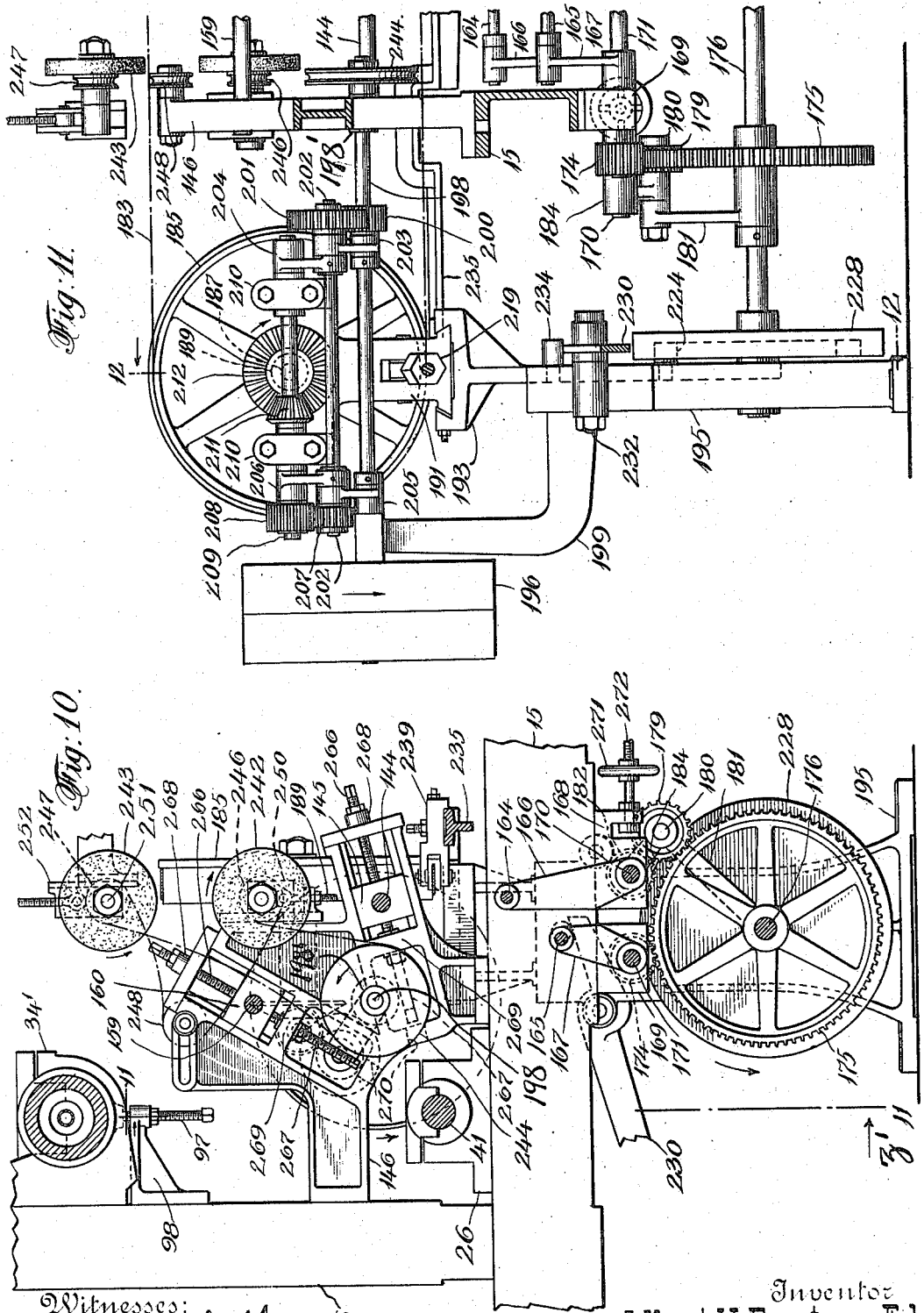

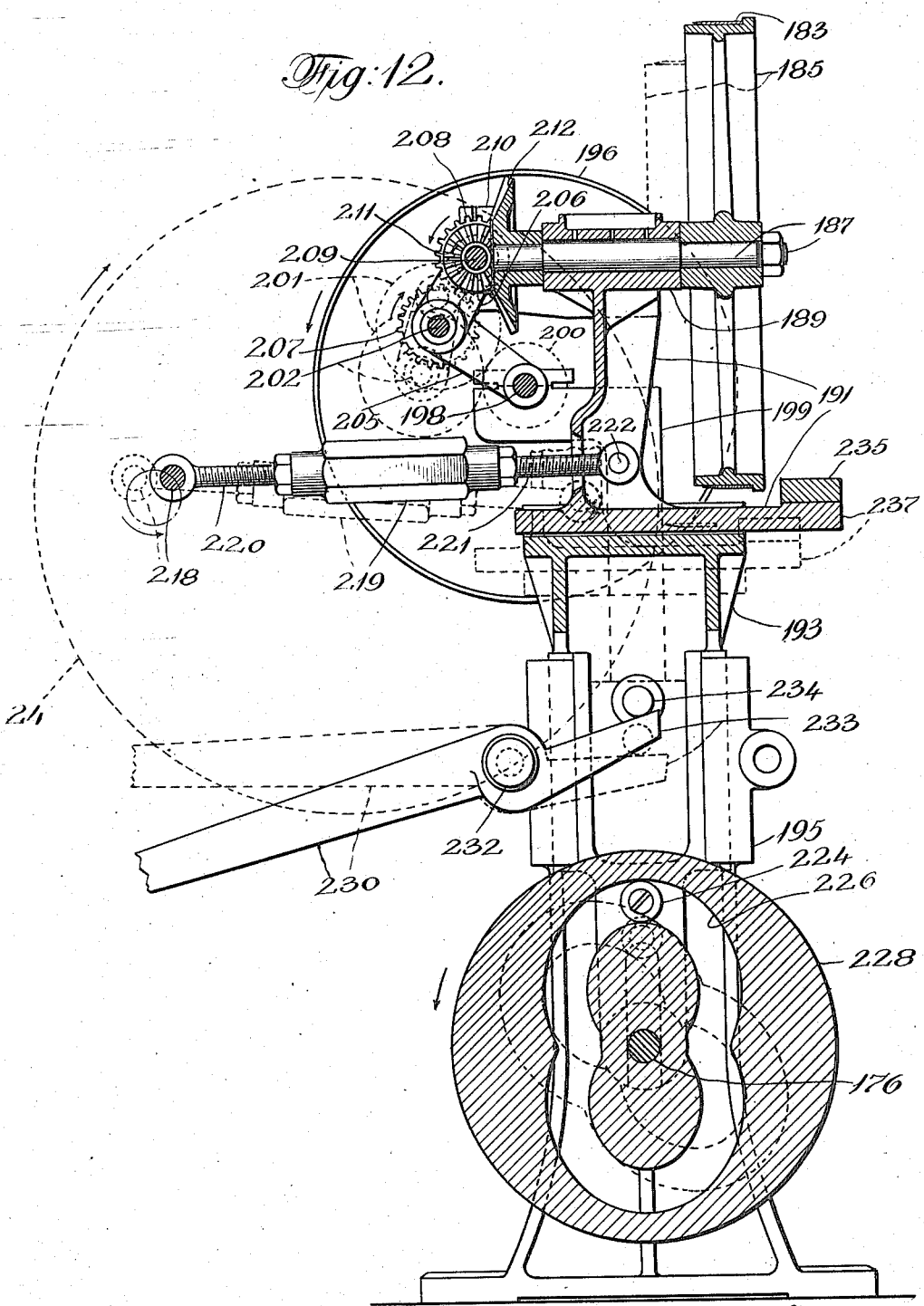

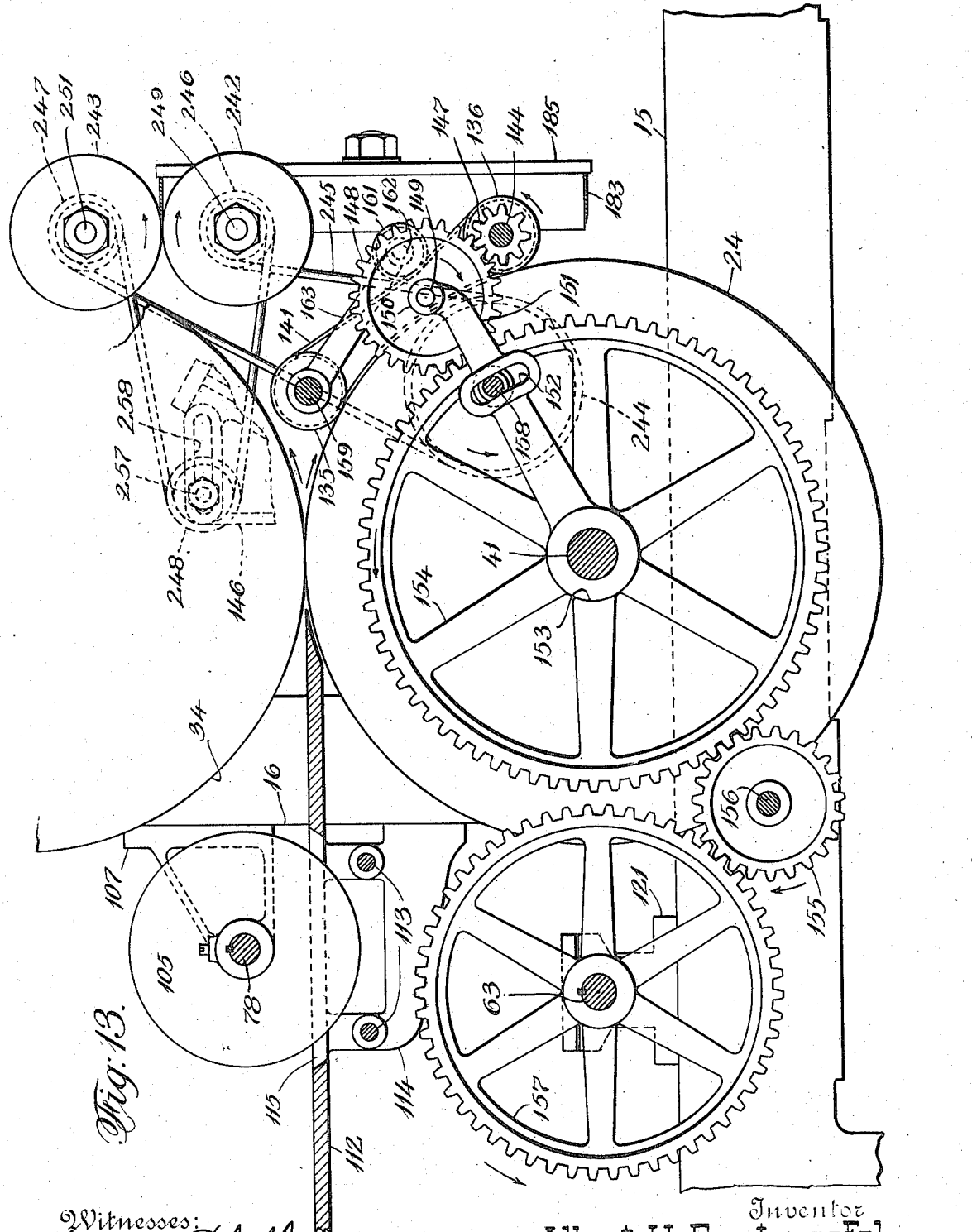

UNITED STATES PATENT OFFICE.

ALBERT H. BIERTUEMPFEL, OF NEWARK, NEW JERSEY.

COMPOSITION-CORK COMPRESSOR.

1,128,840.

Specification of Letters Patent.

Patented Feb. 16, 1915.

Application filed July 20, 1912. Serial No. 710,648.

*To all whom it may concern:*

Be it known that I, ALBERT H. BIERTUEMPFEL, citizen of the United States, residing at Newark, in the county of Essex and State of New Jersey, have invented certain new and useful Improvements in Composition-Cork Compressors; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in that class of apparatus known in the art as composition cork compressors; and, this invention has reference, more particularly, to a novel arrangement and combination of devices and instrumentalities for producing composition cork and compressing it into the form of sheet-board of desired width, length and thickness.

The invention has for its principal object to provide an automatically operating arrangement and combination of devices and instrumentalities in the form of a complete apparatus or machine, which will rapidly and economically produce composition cork from waste cork, or other suitable or similar material, which is pulverized and may be mixed with other ingredients so as to render it heat-proof, water-proof, and elastic, and the machine or apparatus being further adapted to compress such composition cork into sheet-board of any desired width, length and thickness, the apparatus or machine being provided with an automatically operating high-speed cutter or knife, which has a combined lateral and rotary motion, and cuts into the cork-mass or plastic material before it is finally set, thereby producing means which will cut off the produced material, without the material tearing or bulging directly in front of the laterally moving and rotary cutter.

The invention has for its further object to provide an apparatus or machine of the general character and type hereinafter more particularly set forth, for producing cork-composition sheet-board which is superior to natural cork, and serves excellently for a multitude of uses, such as pipe coverings, floor coverings, trunk and box linings, sheeting for bottle-packing, as a substitute for the corrugated paper now in common use, and for partitions, etc., and also to serve as the substitute for the ordinary cardboard now used for various purposes.

It is of essential importance in an apparatus or machine of this character and the parts chiefly concerned, to provide an efficiently and readily operating length cutting-off mechanism, which mechanism comprises a band-knife capable of cutting the sheet-boards to different lengths, while the said sheet-board is traveling through the machine at utmost speed, and the said cutting off mechanism being provided with means and such arrangement of parts that the most exact and correct mutual adjustment can be rapidly made in a most simple manner, providing, also, a novel and simply constructed supporting frame for the band-knife, the frame being suitably counterbalanced and a novel means for trimming off the cut-off parts, all of which will hereinafter more fully appear.

The invention has for its further object to provide an arrangement of trimming knives mounted upon a splined shaft, said shaft revolving in bearings secured to an upright frame which are adapted to be shifted laterally to various widths and clamped firmly to the widths of the strips of the cork-board desired.

Other objects of the present invention not at this time more particularly enumerated will be clearly understood from the following detailed description of the present invention.

With the various objects of the present invention in view, this invention consists, primarily, in a novel composition cork compressor or apparatus hereinafter set forth; and, the invention consists, furthermore, in the general arrangements and combinations of devices and instrumentalities set forth more in detail in the following specification, combining in a composition-cork compressor, an elevator-conveyer, solution-heaters and mixers, a screw-conveyer and mixer, adjustable cylindrical compressor rolls, suitable scrapers, width-trimmers, and length cutting-off mechanism, all of which coöperate with one another and act in unison to produce a perfect apparatus or machine of the character hereinafter more fully described.

This invention consists, furthermore, in the combination with the devices and instrumentalities specified, when desired, of means for placing layers of paper upon the outer surfaces of the cork-composition, the paper being suitably mounted at the front of the machine and being run off from suitable rolls, as shown in the drawings and as will hereinafter more fully appear.

It will also be made to appear, that the length cutting-off mechanism may be put out of motion by a shifter-belt, and that the sheet-cork may be finally wound upon suitable rolls.

The invention is clearly illustrated in the accompanying drawings, in which:—

Figure 2:
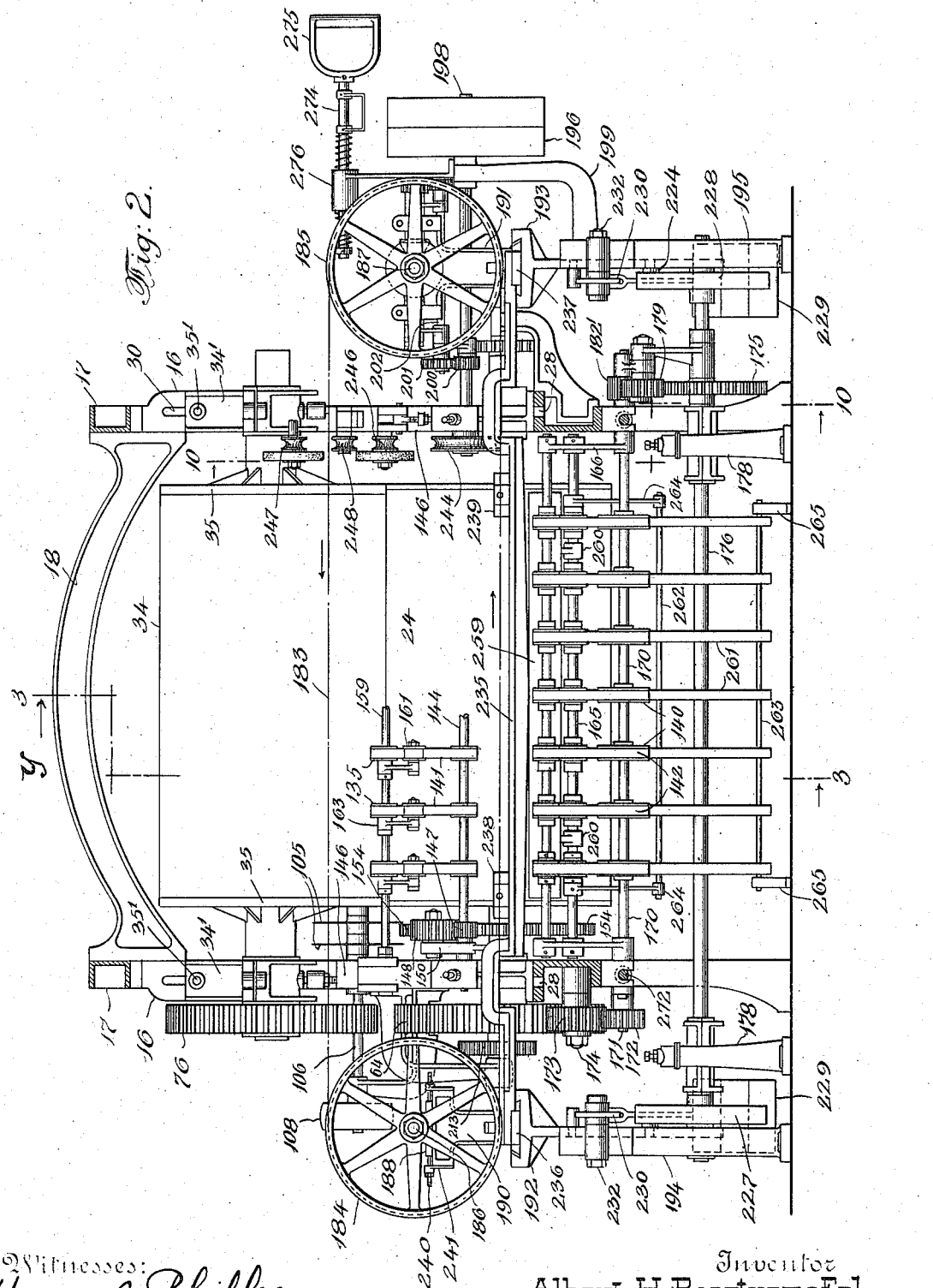
Figure 3:
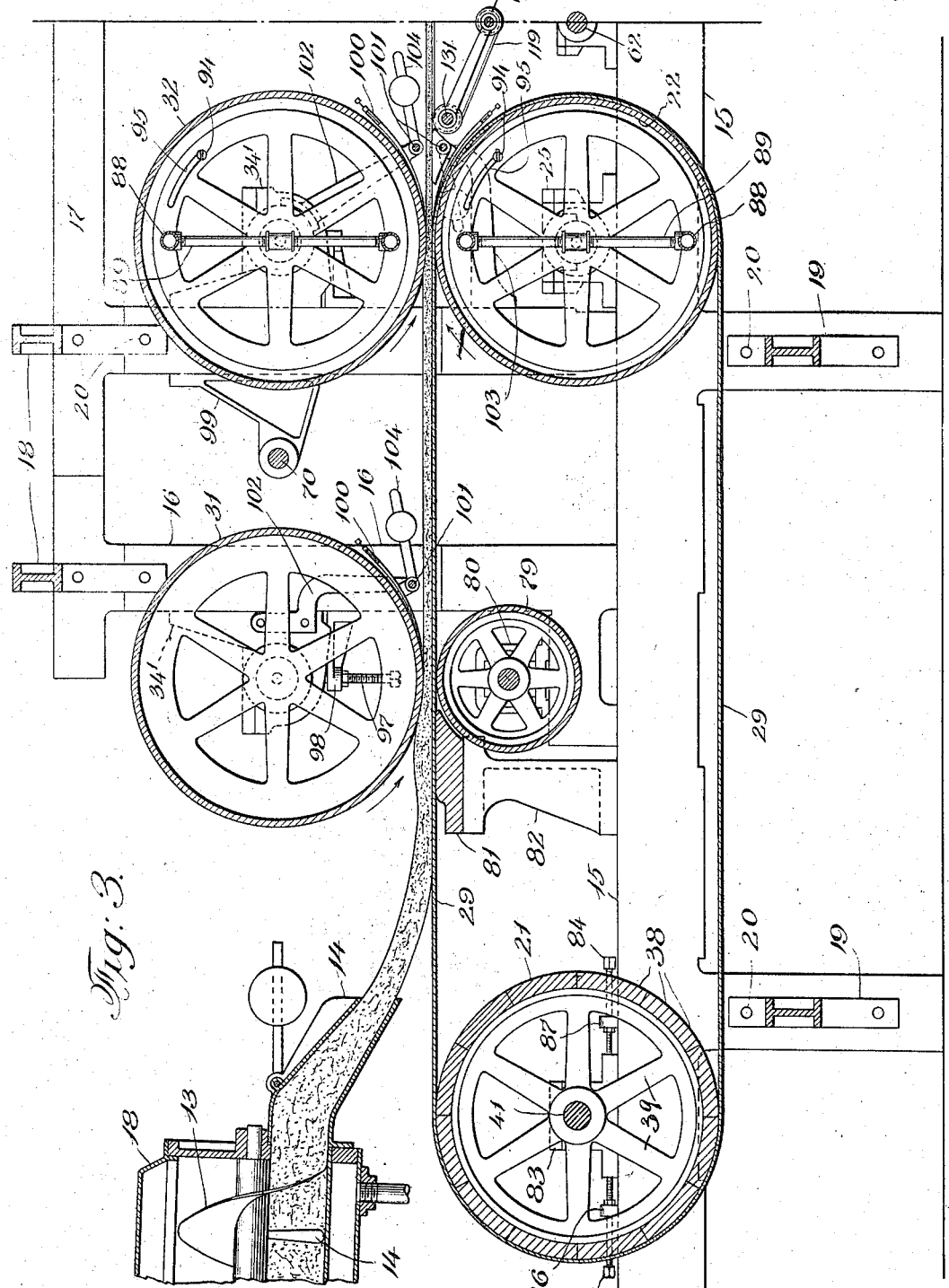
Figure 4:
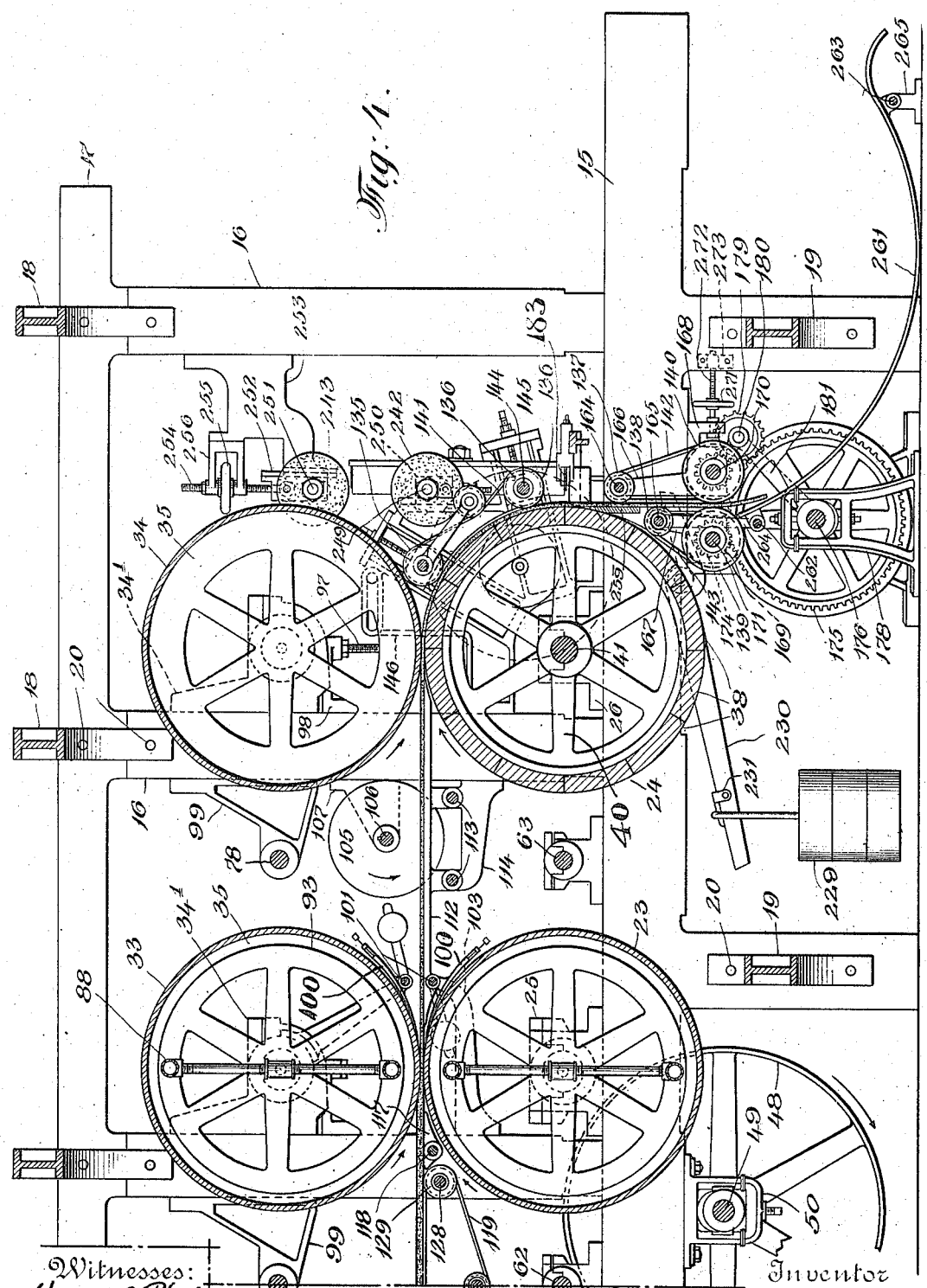
Figure 5:
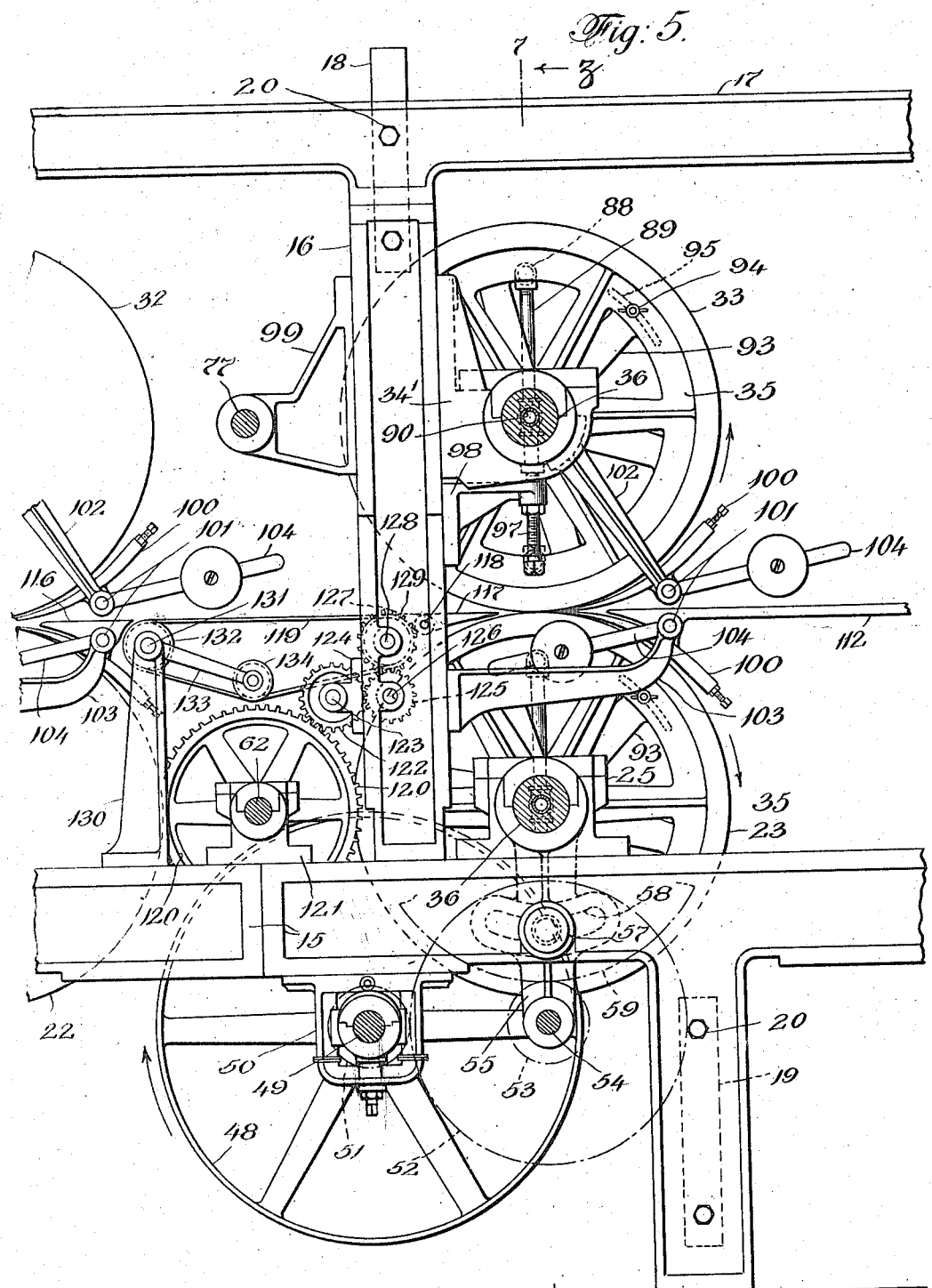
Figure 6:
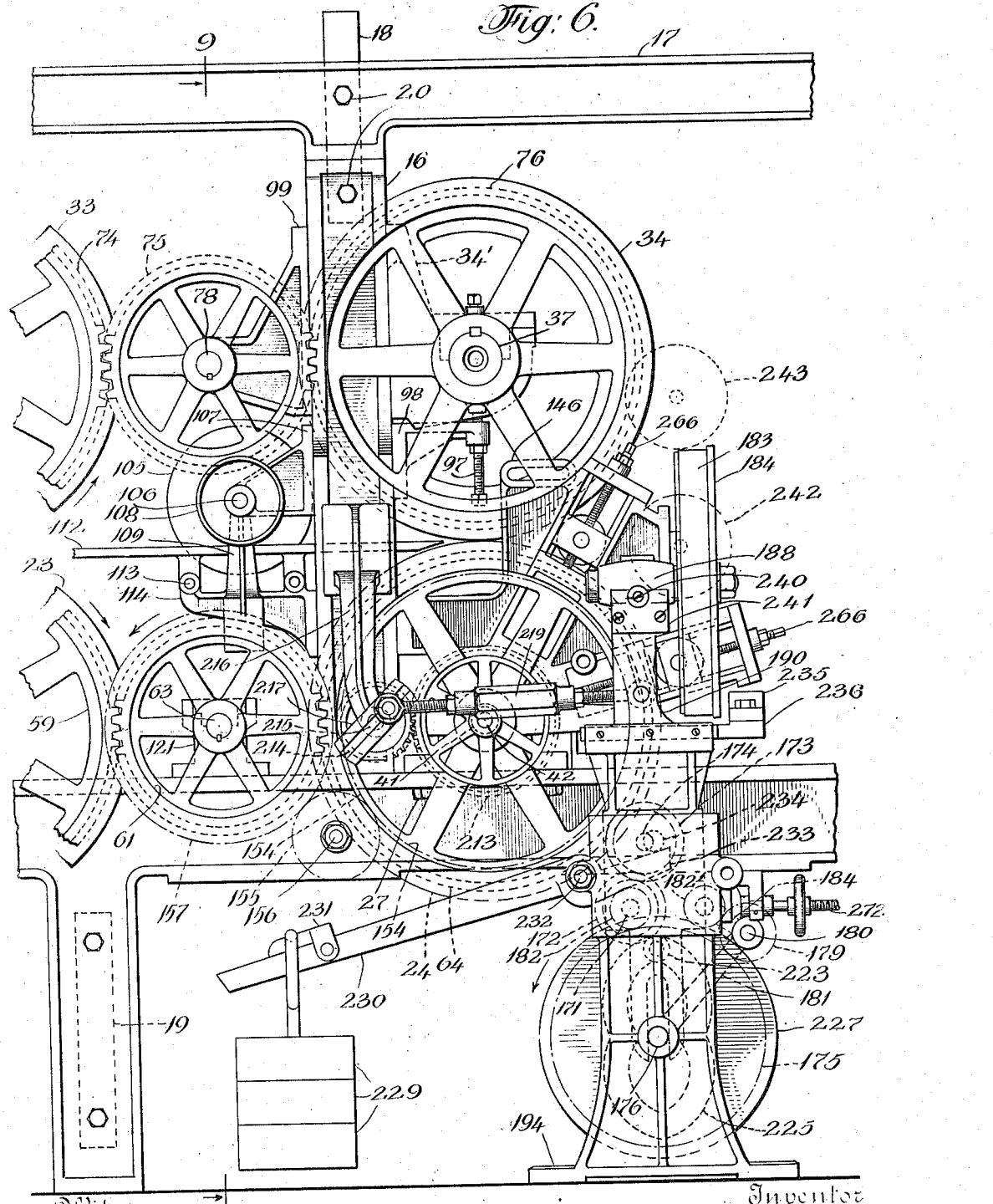
Figure 7:
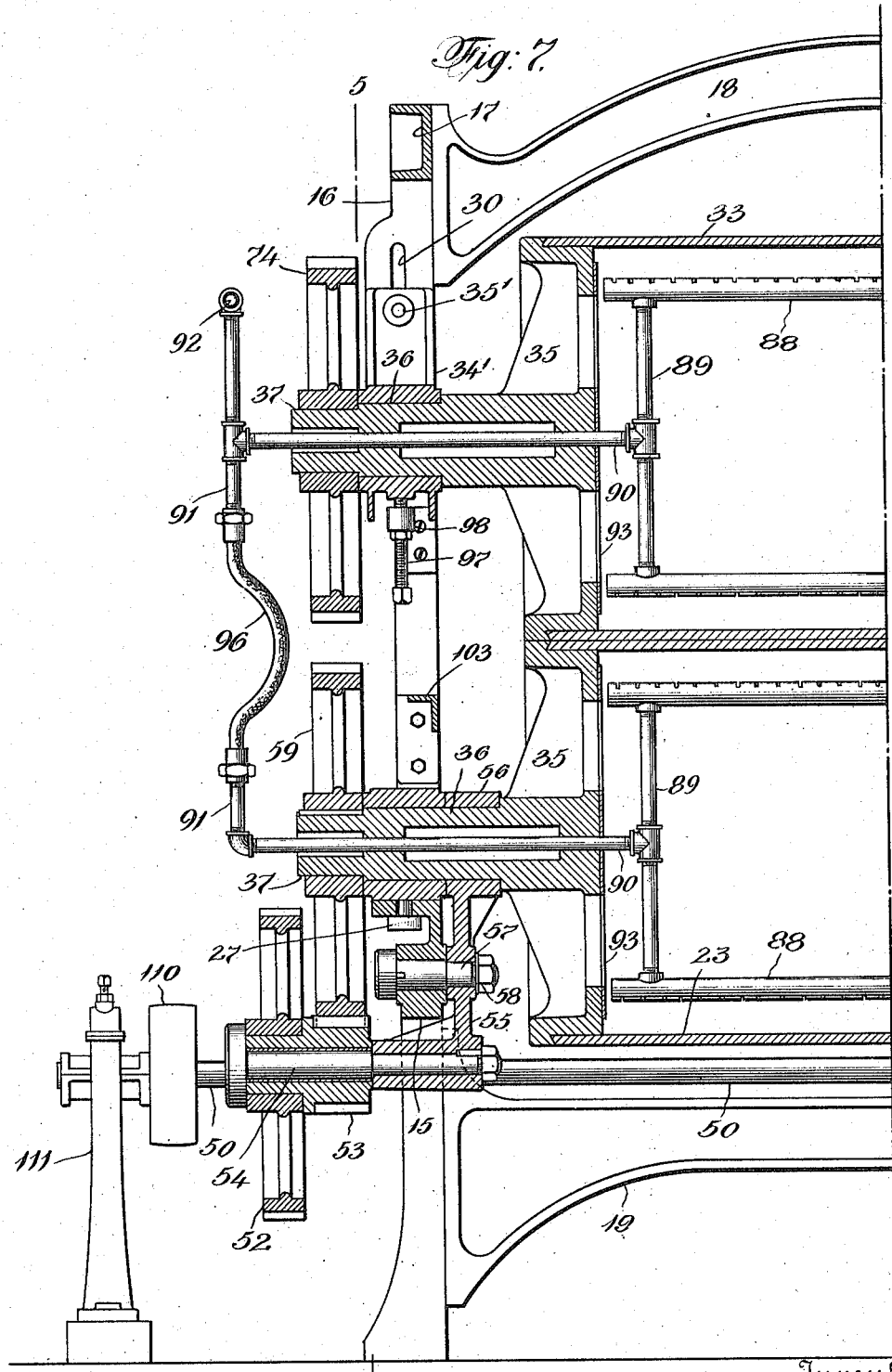
Figure 8:
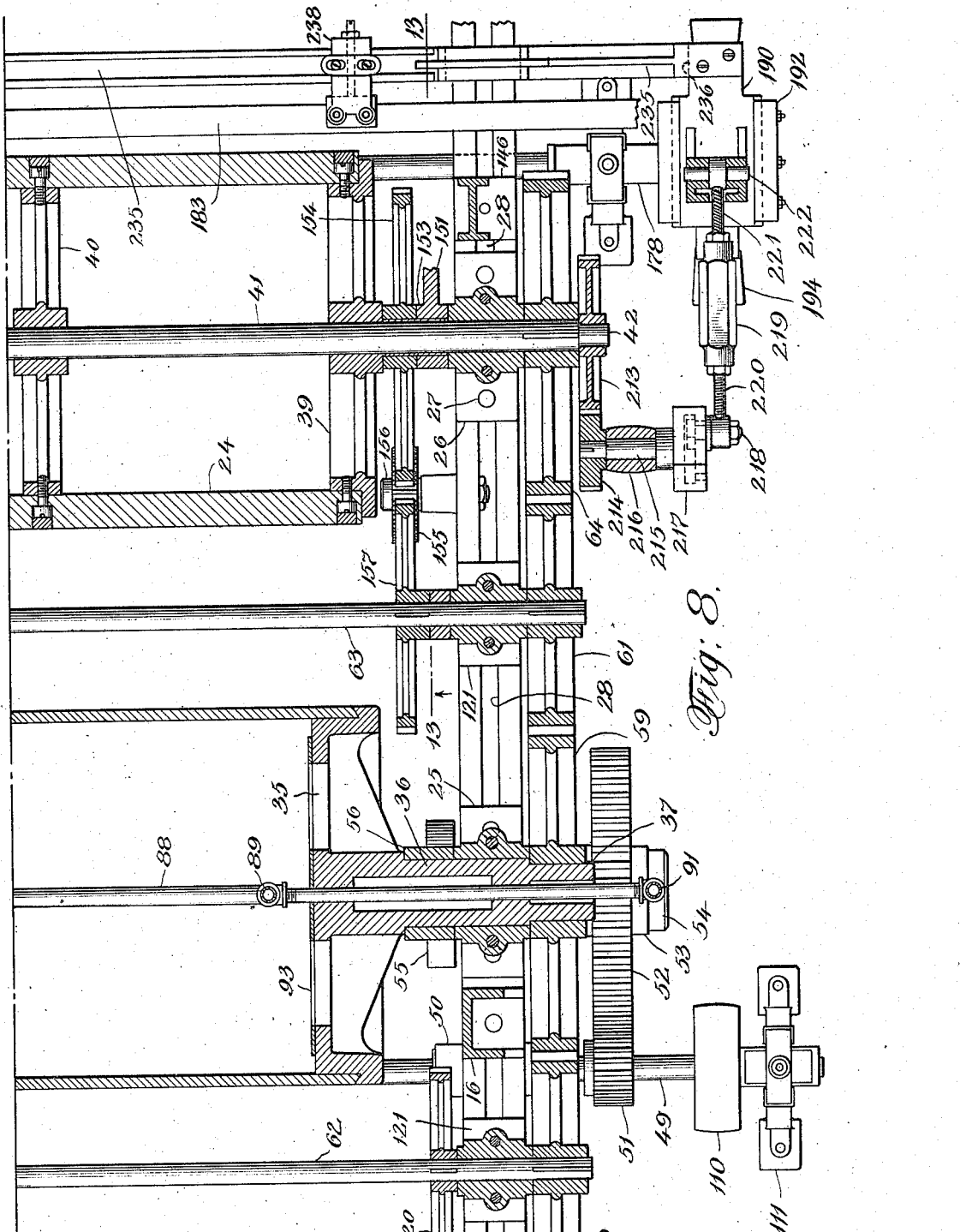

Figure 1 illustrates a diagrammatic assembly longitudinal elevation of the principal devices and instrumentalities which are necessary to provide an apparatus or machine made according to and embodying the principles of the present invention. Fig. 2 is a transverse vertical sectional representation, taken on line 2—2 in said Fig. 1, looking in the direction of the arrow x, with certain parts of the apparatus omitted, said view showing more particularly the cutting-off mechanism, and said view being made on an enlarged scale. Fig. 3 is an enlarged detail longitudinal vertical section, said section being taken on line 3—3 in said Fig. 2, looking in the direction of the arrow y, said view showing the intake end-portion of the machine or apparatus; and Fig. 4 is a similar sectional representation taken on the same line 3—3 in said Fig. 2, but illustrating the delivery end-portion of the apparatus or machine. Fig. 5 is an enlarged combined side-elevation and vertical sectional representation of a portion of the apparatus or machine, said section being represented as taken on line 5—5 in Fig. 7; and Fig. 6 is a side elevation of the disk-trimming and the length cutting-off mechanism or attachments, said view being also made on an enlarged scale. Fig. 7 is a detail transverse vertical section, said section being represented as being taken on line 7—7 in said Fig. 5, looking in the direction of the arrow z; and Fig. 8 is a horizontal sectional representation of a portion of the apparatus or machine, said section being taken on line 8—8 in Fig. 1. Fig. 9 is a detail transverse vertical section, similar to the section represented in Fig. 7, said section being taken on line 9—9 in said Fig. 6; and Fig. 10 is a detail side view in section, taken on line 10—10 in Fig. 2. Fig. 11 is an end view, in section, taken through line 11—11 in said Fig. 10, looking in the direction of the arrow z', with certain parts of the mechanism removed for clearness; Fig. 12 is an enlarged vertical sectional representation, taken on line 12—12 in said Fig. 11; and Fig. 13 is another enlarged vertical sectional representation, with certain parts removed, said section being represented as being taken on line 13—13 in Fig. 8.

Similar characters of reference are employed in all of the above described views, to indicate corresponding parts.

Referring now to the figures of the drawings, the reference-character 1 indicates a suitable spout or other suitable conveying means leading from a hopper or hoppers, not shown in the accompanying drawings, and provided with a suitable gate or closing means, as 2, for feeding automatically by gravity pulverized cork-material into an elevated booth 3, or other suitable receiver. This booth or receiver 3 is provided with a suitably constructed force-feed, as 4, and by means of an endless elevator-belt 5, or other suitable conveyer, and buckets 6, the contents of said booth or receiver 3 are carried into a hopper 7, suitably mounted upon a steam-jacketed conveyer 8, by means of suitable ducts or pipes 9. The said ducts or pipes 9 may be provided with a window 10, of glass or other transparent material, to enable the attendant to observe the flow of and to gage the quantity of pulverized cork necessary to be fed into the hopper 7 and conveyer 8.

Arranged upon a platform 12, or other suitable place, are suitably constructed solution-containing heaters and mixers 11, which are provided with spouts 13 for conveying or guiding the solution from one or all of the said heaters or mixers 11 to the hopper 7 and into the previously-mentioned conveyer 8 in which the cork-material and solution are thoroughly mixed and conveyed by means of a rotating screw or worm, as 13', which is also preferably provided with baffles or arms, as 14, to a spout 14'. The material, when it reaches this spout is sufficiently mixed and sufficiently hardened, so as to be formed into composition sheet-board, by means of that part of the mechanism or apparatus in which the compression takes place, and which part of the apparatus will hereinafter be termed the cork-compressor.

This cork-compressor consists, essentially, of a main supporting frame 15 to which are suitably secured suitable uprights or standards 16 which are made rigid by means of longitudinally extending brace-supports 17, transverse upper brace-supports 18, and lower brace-supports 19, all of which are rigidly secured in their properly assembled relations, by means of bolts 20, or other suitably constructed fastening devices.

As shown, cylindrical compression rolls 22, 23 and 24 are suitably mounted in horizontal bearings 25 and 26, said bearings, and in consequence thereof the said rolls, being capable of longitudinal adjustment, such adjustment being adapted to be made by means of bolts 27 which pass through elongated openings or slots 28 formed in the main frame 15, all of which is clearly shown, and the bearings being prevented from shifting by means of the said bolts, as will be clearly understood. A cylinder 21, similar in construction to and of the same diameter as the cylinder 24, is also employed and serves as a take-up roll for a suitable belt 29 which rides upon the said cylinder 21 and the cylinder 22. An upper set of cylindrical compressor rolls 31, 32, 33 and 34 are suitably mounted and are free to revolve in vertical bearings, as 34', which are also adjustable, but in vertical or upright direction, through the aid of elongated openings or slots 30 in the uprights or standards 16 and suitable bolts 35', as will be clearly evident.

The preferred construction of each cylindrical compressor roll 22, 23, 31, 32, 33 and 34, is in the form of a tube or piece of piping, suitably secured to or connected at its ends to suitably formed heads or spiders, as 35, provided with outwardly extending tubular projections 36, forming the axles of the said rolls, and by means of which the said rolls are rotatably mounted in the respective bearings. Each journal-like tubular projection 36 is also formed with a reduced shank-like end-portion, as 37, the purpose of which will be hereinafter more fully explained. The previously mentioned take-up roll 21, and the roll 24 which serves as a guide-roll, as has been stated, are similar in construction, their cylindrical surface-portions being preferably made with sectional wood-batter 38, which is screwed or glued to the heads or spiders 39 and 40 of the respective rolls 21 and 24, these heads or spiders being keyed to the steel shafts 41. Each shaft 41 is provided with the reduced free end-portions 42, the purpose of which will be later on more fully specified.

Rotary motion is transmitted to the said compression rolls, by means of a belt, as 44, from a counter-shaft 43, this shaft being driven from a belt 46 which receives its power from a suitable motor 45. The belt 44 passes over and operates a pulley 48 which is suitably fixed upon a shaft 49 mounted and running in pillow-block bearings 52 which are suitably secured to the horizontal main frame 15. Upon the said shaft 49 is keyed, or otherwise suitably secured, a pinion 51 which meshes with an intermediate spur-gear 52, said spur-gear being provided at its center with a suitable stub-gear 53, both of which are loosely and rotatably mounted upon a stud-pin, as 54, extending from the side of a yoke-like element or member 55. The upper end-portion of this yoke-like element or member 55 is loosely or pivotally suspended from the journal-like projection 36 herein-above mentioned, the said element or member 55 being also provided with a slotted segmental portion 58, through the slot of which, which is concentric with the central axis of the projection 36, extends a stud-bolt 57 which is secured in the main frame 15 and is adapted for firmly fastening the said yoke-like element or member 55 in its properly adjusted relation. The purpose of this yoke-like element or member 55 is to change the spur-gear 52 to one of a smaller or larger diameter, when it is desired to change the speed of the compression rolls, the said element or member 55 being swung in either direction, according to the size of the spur gear, so that the latter will properly mesh with the pinion 51, after which the said element or member 35 is firmly clamped by means of the stud-bolt 57 in its rigid position, as will be clearly understood.

In mesh with the stub-pinion 53 of the spur-gear 52 is another spur-gear 59 which is secured upon the previously-mentioned shank-like end-portion 37 of the tubular projection 36, the said gear 59 having in mesh therewith a pair of intermediate gears 60 and 61 respectively mounted and secured upon a pair of revolving shafts 62 and 63. The said intermediate gear 61 meshes with a spur-gear 64 which is keyed to the shaft 41 of the compression or guide-roll 24 for producing the rotary motion of the latter, and the intermediate gear 60 in turn meshes with an intermediate gear 66, which is loosely mounted upon a shaft or stud 67 fastened to an arm 68 which is supported at its one end loosely upon the axle or journal-portion of the compression roll 22. Suspended from a stationary shaft 70 is a supporting arm 69 with the lower end-portion of which the said stud 67 is oscillatorily connected. By means of another intermediate gear 70', which is loosely mounted upon the said shaft 70, rotary motion is transmitted to a train of gears 71, 72, 73, 74, 75, and 76 all of which are respectively operatively connected with and to the upper set of compression rolls and a pair of intermediately disposed shafts 77 and 78.

Directly beneath the belt 29, as will be more particularly seen from an inspection of Fig. 3 of the drawings, is an idler roll 79 which is rotatably mounted in pillow-block bearings 80, suitably secured to and supported upon the uprights or standards 16, and to the left of this idler roll 79 is a compression plate 81 which is suitably secured to vertical brackets 82 upon the main frame 15, preferably by being screwed to the said brackets. The said plate 81 and the roll 79 serve as a guiding means for the belt 29, said roll 79 with the roll 31 firmly compressing the composition cork-material as the first compression occurs. The said plate 81 may also be properly adjusted and may be securely clamped or fixed in its adjusted position by means of suitable bolts which enter elongated openings or slots in the main frame 15. Provision is also made to take up the slack of the belt 29 and is accomplished by means of the previously mentioned take-up roll which is supported upon the shaft 41 which is rotatably mounted in the bearing-portions of suitable pillow-blocks 83, the latter being adjustable lengthwise by means of an arrangement of adjusting screws, as 84 and 85, which are threaded into the members 86 and 87, which in turn are secured upon the main frame 15. The said lower and upper compression rolls 22, 23, 32 and 33 are also suitably and gently heated by steam or gas, as may be preferred, to a sufficient degree of heat, in order that the composition board is a trifle softened, so that the consecutively following compressions of the material are properly made and take place, as the operations proceed. The heating facilities, in the present instance, comprise within each compression roll a suitable arrangement of tubular gas-burners, as 88, which are located near the inner peripheral surfaces of the rolls, substantially as shown in Figs. 7 and 8, gas being admitted to the said burners 88 through an arrangement of pipes 89, 90, 91 and a main supply pipe 92, the pipes 90 passing through the journal-like tubular projections 36 herein-before mentioned. Thus it will be evident, that as the compression rolls revolve, their peripheral surfaces are constantly kept heated. A suitably constructed regulator, as 93, is also provided to control the amount of air which enters the said compression rolls through the openings in their heads 35, the regulator being easily adjusted, according to existing conditions, by means of an adjusting device 94, as a wing-nut and screw, see Fig. 3, the screws being disposed in concentric slots 95 and the wing-nuts being clamped upon the inner faces of the heads 35, as will be clearly evident. Provision is furthermore made in the form of a flexible tube, as 96, which is connected with the pipe 91, to give free admission to the gas at all times, as adjustments are being made on the cylindrical compressors for gaging the thickness of the sheet-board.

By means of suitable adjusting screws 97 which are fitted and work in correspondingly threaded portions of supporting brackets 98, said brackets being suitably mounted and secured upon the standards or uprights 16, the upper compressor-cylinders can be elevated to a proper height so as to be accommodated to the composition which is to be compressed into sheet-boards of various thicknesses. After the proper adjustments have been made by means of these screws, the previously-mentioned vertical bearings 34' are permanently secured in place by means of the bolts 35' which pass through the slots 30 with which the standards or uprights are provided. To the left of the said standards or uprights 16 are other necessary bearings, as 99, which are bolted to the said standards or uprights and serve as supports for the intermediate shafts 70, 77 and 78. These bearings 99 are also capable of vertical adjustment relatively to the bearings 34'. Suitably formed scrapers 100 are affixed to bars 101 which are fulcrumed in brackets 102 and 103, the brackets 103 being stationary by being fixed to the uprights or standards 16, whereas the brackets 102 are adapted to be raised with the upper compressor-cylinders by being secured to the vertical bearings 34. Weighted arms, as 104, are also rigidly connected with the said bars 101 whereby the scraping contact of the scrapers with the compressor-cylinders is maintained, and the material in passing between the cylinders is thereby prevented from adhering to the surfaces of the cylinders in case a more or less sticky solution is used for the various compositions made. Rotary cutters 105 mounted upon a splined shaft 106 are also used, said shaft being mounted in bearing-brackets 107 secured upon the standards or brackets 16, said cutters being employed for splitting the cork-material, if desired, into several narrow strips and to trim the marginal edges of the two outer strips, as the cork-material travels through the machine. Suitably mounted upon the outer end-portion of said shaft 106 is a driven pulley 108, said end-portion of the said shaft being also rotatably mounted in a suitable bearing-bracket 109. The driven pulley 108, see Fig. 8, receives its rotary motion from a driving pulley 110 which is keyed to the main shaft 49, the end-portion of said shaft 49 being also rotatably mounted in a supporting bearing 111.

To prevent the sheet-board from sagging and to properly guide the material as it is being carried from one set of cylinders or rolls to the next set of cylinders or rolls, suitable supporting fingers or plates 112 are mounted upon rods 113 and upon the bars 101, the said rods 113 being carried by suitably constructed members or elements 114 which are bolted or otherwise secured to the said uprights or standards 16. The said fingers or plates 112 are also provided with suitably disposed elongated openings or slots 115 into which the suitably formed cutters 105, are allowed to enter, in a manner clearly indicated in Figs. 4 and 9 of the drawings. In order to further prevent the sheet-board from sagging between the compressor-rolls or cylinders, and to be properly fed and guided from one set of rolls or cylinders, to the next set of rolls or cylinders, a plurality of fingers 116 and 117 supported upon the said bars 101 and rods 118 and narrow belts 119 are also used, power being obtained from a spur-gear 120 which is keyed upon the intermediate shaft 62, mounted in adjustable bearings 121, and said spur-gear being engaged by an intermediate pinion 122 which is mounted upon a stud-shaft 123 rotatably supported in a bracket 124 suitably affixed to an upright or standard 16. The said pinion meshes with a similar intermediate pinion 125 which is mounted upon a stud-shaft 126 and said pinion 125 meshes with another pinion 127 keyed upon a rotary shaft 128, said shafts 126 and 128 being suitably supported in bearing-portions with which the standard or upright 16 is provided. The previously-mentioned narrow belts 119 are driven from flanged pulleys 129 which are suitably fastened to said rotary shaft 128. Upon a stationary member or element 130 a fixed shaft 131 is supported, upon which are loosely and rotatably mounted a series of flanged pulleys 132 which correspond in number to the narrow belts 119 and serve to support and properly guide the said belts 119, as will be clearly evident. Suspended from said shaft 131 are arms 133 between the free end-portions of which is loosely and rotatably mounted a tension pulley or roller 134 which is in rolling contact with the lower portions of said belts 119, and tends to at all times maintain the said belts under tension.

As shown, the delivery end of the apparatus or machine is provided with a number of guide-pulleys, as 135, 136, 137 and 138, and flanged pulleys, as 139 and 140, the said pulleys being also provided with narrow belts 141, 142 and 143. The said flanged pulley 136 is keyed to a revolving shaft 144 which is mounted in bearing-blocks 145, as clearly illustrated in Figs. 4, 10 and 13, said bearing-blocks being suitably supported in a suitably formed radial frame 146. Upon one end of said shaft 144 is secured a pinion 147 which meshes with an intermediate gear 148, said gear revolving freely upon a stud-pin 149 screwed into the end 150 of a swinging yoke 151, said yoke being loosely mounted by means of the part 153 upon the cylinder-shaft 41, and being also provided with a slotted portion, as 152, which is related concentrically to the said shaft 41, substantially as shown in Fig. 13 of the drawings. The previously-mentioned gear 148 engages a gear 154 which is loosely mounted upon said shaft 41, and in mesh with said gear 154 is an idler-gear, as 155, loosely mounted upon a pin 156 extending from the main frame 15 of the apparatus, said idler-gear in turn engaging a gear 157 which is suitably secured upon the intermediate shaft 63, the purpose of the system or arrangement of gearing being to produce the rotary motion of the shaft 144, so as to properly operate the belts 141 and 142.

The principal object of the previously-mentioned slotted portion 153, connected with the yoke 151, is to allow for larger or smaller pinions 147 to be placed upon the shaft 144, and to properly make the adjustments of the gears after they have been set, a bolt 158 entering the said slot 152 and being screwed into a screw-threaded hole in the side of the radial frame 146 and clamped in a stationary position. Motion is transmitted by means of the narrow belts 141 to the flanged pulleys 135 which are loosely supported upon a shaft 159, said shaft being suitably mounted in block-bearings 160, said belts being maintained in their taut relation by means of grooved or flanged tension pulleys 161 which freely rotate upon pins 162 secured to arms 163, said pulleys 161 by their own weight tending to keep said narrow belts 141 taut, as will be clearly evident. The said flanged pulleys 137 and 138 are loosely mounted upon stationary shafts 164 and 165 which are supported in upward projections 166 and 167 formed upon suitably constructed slide-bearings 168 and 169 which in turn are secured to the main frame 15. A pinion 173 which is freely mounted upon a stud-pin 174, also secured to the said main frame 15, meshes with the spur-gear 64, which is secured upon the cylinder-shaft 41, as clearly shown in Figs. 2 and 6 of the drawings, and to the said shaft 171 is keyed, or otherwise secured, a pinion 172.

To the right of the shaft 171 is fixed a spur-gear 182 which is in mesh with a gear 175 suitably secured by being keyed to a cam-shaft 176 which is mounted in stand-bearings, as 178, suitably bolted to the floor. The said gear 175 also meshes with an intermediate pinion 179 which revolves freely upon a stud-pin 180 suitably secured to an arm 181, and which arm 181 is loosely supported upon the said cam-shaft 176. The said pinion 179 also engages with a pinion 182' which is keyed to the shaft 170 mounted, as has been stated, in the bearings 168. A suitable link which is fulcrumed upon said shaft 170, and is connected to the stud-pin 180 and the arm 181, serves to hold the said pinion 179 in mesh with the pinion 182' and the cam-gear 175. Through this arrangement of transmission gearing, motion is transmitted to the flanged pulleys 139 and 140 and to the narrow belts 142 and 143, for the purpose of feeding and guiding the material away from the apparatus or machine, after it has been cut off by means of a suitable cutting-off mechanism. One form of such cutting-off mechanism which it is preferred to apply with the present form of apparatus or machine, consists essentially of an endless steel band-knife 183 which is supported upon flanged pulleys 184 and 185, suitably secured to stud-shafts 186 and 187 which are mounted in suitably disposed bearings 188 and 189, connected with reciprocating slides 190 and 191. The said reciprocating slides are suitably supported upon vertical slides 192 and 193 which are suitably mounted in the standard-bearings 194 and 195 which are firmly secured to the floor. Rectilinear movement of the previously-mentioned band-knife 183 is obtained from a driven pulley 196 and a suitable belt 197, connected to a pulley upon the counter-shaft 43, as will be evident from an inspection of Fig. 1 of the drawings, said pulley 196 being keyed to a shaft 198 which is mounted in the bearing-portions of a bracket 199, suitably fastened to a standard 195 and a bearing formed in the previously-mentioned radial frame 145, substantially as shown in Figs. 2, 10 and 11 of the drawings. Suitably mounted upon said shaft 198 is a pinion 200 which engages a swinging intermediate gear 201 fixed to a swinging shaft 202 mounted in the bearing-portions of a system of suitably arranged links 203, 204, 205 and 206. Upon its opposite end-portion, the said swinging shaft 202 is provided with a fixed pinion 207 which meshes with a pinion 208 secured to the shaft 209 mounted in suitable bearings 210 formed upon the reciprocating slide 191. The said links are free to move as the reciprocatory and vertical movements take place, which operation will be presently more fully set forth. Movement, vertically toward and from the compressed cork-material passing off the roller 24, is constantly transmitted to the band-knife 183 from a bevel-gear 211 which is keyed to the said shaft 209 and meshes with a bevel gear 212 which is keyed to the stub-shaft 187. The reciprocatory motion of the said slide 191, see Fig. 8 of the drawings, is produced by means of a spur-gear 213 which is fixed to the end 42 of the compressor-roll or cylinder-shaft 41, said spur-gear 213 engaging with a gear 214 which is keyed to a short stud-shaft 215 suitably mounted in bearing-brackets 216 which are secured to the main frame 15 and the uprights or standards 16. The outer end of the said shaft 215 is provided with a grooved arm 217, through which is fastened a suitable bolt 218 with which is connected a turnbuckle or connecting element, as 219, which is provided with right and left screw-threaded eye-bolts 220 and 221, for the purpose of mutual adjustment, the left screw-threaded eye-bolt being secured to the reciprocating slide 191 by means of a pin 222, or other suitable fastening means. Through the arrangement and contrivance of these various members, the slide is operated back and forth, with the aid of the stud 215 serving as a crank-shaft which may be suitably adjusted to various strokes, as may be necessary.

A similar arrangement of turnbuckle, and gear 213, and other interconnecting parts, is also provided upon the opposite side of the apparatus or machine, operating simultaneously and in unison with the various other devices and parts herein-above described.

The previously-mentioned vertical slides 192 and 193, which carry the said reciprocatory slides 190 and 191, carry suitably disposed anti-friction rollers 223 and 224, said rollers engaging with the grooves 225 and 226 of suitable cams, as 227 and 228, suitably secured to the outer end of the cam-shaft 176, as clearly shown, and whereby the vertical movement, as will be clearly evident, is transmitted to the band-knife. To relieve the pressure of the said anti-friction rolls and the said cams, counter-weights 229 are provided, said weights being hung in levers 230 from members 231 which are adjusted in either direction and are adapted to be clamped in fixed relation, after adjustment, as will be evident. The said levers 230 are pivoted upon pins 232, extending from bosses upon the standards 194 and 195, and to the ends 233 of said levers 230 are pins 234 suitably secured to the said vertical slides. Thus, it will be evident, that as the said slides are in motion, the heavy strains are counteracted and removed from the cams by the said counter-weights. A suitable brace-bar 235 is also suitably fastened to projections 236 and 237 upon said slides 192 and 193, said brace-bar being provided with suitable band-knife guides 238 and 239 which prevent the wobbling of the knife when the latter has been properly set.

The bearing 188 which is mounted upon the reciprocating slide 190, see Figs. 2 and 8, is capable of lengthwise adjustment by means of adjusting screws 240 which are threaded into brackets 241, suitably bolted to said slide. By means of these adjustments, the said flanged pulley 184 can also be adjusted and set in its proper relation to the band-knife, so as to tighten the latter.

From the foregoing description it will be seen that while the band-knife has a rectilinear motion laterally across the machine, in front of the belt of the downwardly moving cork-material, the movements of the reciprocatory slides 190 and 191 and the vertically movable slides, in conjunction with the cams 227 and 228, will also produce a motion of the band-knife 183, as a whole, in the path of an ellipse. In this manner, the lower run of the laterally moving endless band-knife cuts into and through the cork-material as the latter is traveling downwardly, since the forward motion of the band-knife is contemporaneous with its downward travel and that of the strip or belt of cork-material which it severs. Thus, the cork-material is being intermittently clean cut into the desired length, the cutting portion of the band-knife moving with the material, and immediately receding and traveling upward apart from the succeeding portion of the strip or belt of cork-material, so that the travel of the latter continues without interruption. For occasionally sharpening the said band-knife, emery wheels 242 and 243 are provided, which are operated from a suitable belt, as 245, passing over a sheave-pulley 244, keyed to the shaft 198, said belt passing also over sheave-pulleys 246 and 247 and a take-up sheave-pulley 248. The said pulley 246 is fixed to a stud 249 which is loosely supported upon a slide 253, as clearly shown in Figs. 4 and 10 of the drawings, said slide being adjustably mounted upon the radial frame 146. The emery wheel 243 is secured upon a pin 251 which is loosely supported upon a slide 252, slidably arranged in suitable grooves formed in a bracket 253 which is bolted to the upright or standard 16. The means for adjusting the said emery wheel consists of a screw-threaded eye-bolt 254, one end of which is fastened to said slide 252. The said bolt is provided with a wheel-like nut, as 255, the threaded portion of which corresponds to the threaded shank of the eye-bolt 254, and is held in its operative relation between the ends of a fork-shaped member 256 which is suitably fixed to the bracket 253. The sheave-pulleys 246 and 247 are fixed to the pin-shafts 249 and 251, and the said take-up sheave-pulley 248 is loosely mounted upon a stud 257 adjustably arranged in a slotted portion 258 with which the said radial frame 146 is provided. When the said band-knife is to be sharpened, the emery-wheels are brought into grinding contact with the said knife, the take-up sheave-pulley 248 being properly set, thus taking in the slack of the said belt 245, and from the driven sheave-pulley 244, the said emery-wheels are set in motion, as will be clearly evident from an inspection of Fig. 13 of the drawings. It will be understood that, during this sharpening operation, the reciprocatory slides 190 and 191 and the vertical slides 192 and 193 are put out of motion, and that only the said band-knife and the emery wheels are set in motion during this grinding operation.

In order that the composition sheet will be prevented from adhering to the cylinder or roll 24, while the material is being cut off, a suitable board 259 is provided, said board being mounted upon members, as 260, which are supported to the stationary framework of the machine. Guide-strips 261, supported upon bars 262 and 263, are also used, the said bar 262 being secured to suspended arms 264 which are supported from the said shaft 165, and the bar 263 being mounted upon brackets 265 fastened in any suitable manner to the floor.

As clearly illustrated in Fig. 10, suitable screw threaded members 266 and 267, working in correspondingly screw-threaded parts 268 and 269 of the radial frame 146, are also provided, for the purpose of suitably adjusting the bearing-blocks 160 and 146 when necessary, suitable holes or open parts, as 270, being also provided for permitting the placing of the said members in position, as will be clearly evident.

From an inspection of Fig. 4 it will be seen, that a round bar 272, which has a hand-wheel 271 fixed thereto, is provided, the one end-portion of said bar being loosely mounted upon the adjustable bearing 168, and the other end-portion of said bar being screw-threaded and engaging a nut-bracket 273 which is suitably secured to the main frame 15.

A suitably constructed belt-shifter 274, which is provided with a handle 275, is mounted in a bracket 276 which in turn is secured to the bracket 199, as shown, and the operation of which will be clearly understood from an inspection of Fig. 2 of the drawings.

Means is also provided for mounting layers of paper upon the surfaces of the composition sheet-board, if desired, and as clearly shown in Fig. 1, the same consisting in an arrangement of paper-rolls, as 277 and 278 which are suitably mounted in brackets, 279 and 280, supported, respectively, upon the said uprights or standards 16 and upon the floor.

I am fully aware that changes may be made in the general arrangements and combinations of the various devices and parts, as well as in the details of the construction of the same, without departing from the scope of the present invention as set forth in the foregoing specification, and as defined in the clauses of the claims which are appended thereto. Hence, I do not limit my present invention to the exact arrangements and combinations of the devices and parts as described in the said specification, nor do I confine myself to the exact details of the construction of the said parts, as illustrated in the accompanying drawings.

I claim:—

1. In a composition cork compressor, the combination with a mixer, of a series of compressor rolls between which the material is fed and compressed, means for directing the compressed material downwardly, and length cutting-off mechanism having a combined lateral rectilinear movement and a vertical movement in the path of an ellipse, its forward motion being contemporaneous with its downward travel and that of the material.

2. In a composition cork compressor, the combination with a mixer, of a series of compressor rolls between which the material is fed and compressed, scraping means coöperating with said rolls to prevent the compressed material clinging to the surfaces of the rolls, means for directing said compressed material downwardly, and length cutting-off mechanism having a combined lateral rectilinear movement and a vertical movement in the path of an ellipse, its forward motion being contemporaneous with its downward travel and that of the material.

3. In a composition cork compressor, the combination with a mixer, of a series of compressor rolls between which the material is fed and compressed, means for directing the compressed material downwardly, scraping means coöperating with said rolls, cutters for cutting the material longitudinally, and length cutting-off mechanism having a combined lateral rectilinear movement and a vertical movement in the path of an ellipse, its forward motion being contemporaneous with its downward travel and that of the material.

4. In a composition cork compressor, the combination with a mixer, of a series of compressor rolls between which the material is fed and compressed, means for directing the compressed material downwardly, and a band-knife having a combined lateral rectilinear movement and a vertical movement in the path of an ellipse, its forward motion being contemporaneous with its downward travel and that of the material.

5. In a composition cork compressor, the combination with a mixer, of a series of compressor rolls between which the material is fed and compressed, scraping means coöperating with said rolls to prevent the compressed material clinging to the surfaces of the rolls, means for directing said compressed material downwardly, and a band-knife having a combined lateral rectilinear movement and a vertical movement in the path of an ellipse, its forward motion being contemporaneous with its downward travel and that of the material.

6. In a composition cork compressor, the combination with a mixer, of a series of compressor rolls between which the material is fed and compressed, scraping means coöperating with said rolls to prevent the compressed material clinging to the surfaces of the rolls, means for directing said compressed material downwardly, cutters for cutting the material longitudinally, and a band-knife having a combined lateral rectilinear movement and a vertical movement in the path of an ellipse, its forward motion being contemporaneous with its downward travel and that of the material.

7. In a composition cork compressor, the combination with a mixer, of a series of compressor rolls between which the material is fed and compressed, scraping means coöperating with said rolls to prevent the compressed material clinging to the surfaces of the rolls, means for directing said compressed material downwardly, cutters for cutting the material longitudinally, length-cutting mechanism, means coöperating with said length-cutting mechanism for moving the same laterally across the apparatus, and mechanism coöperating with said length-cutting mechanism and the means for moving the same laterally for moving said length-cutting mechanism vertically in the path of an ellipse, its forward movement being contemporaneous with its downward travel and that of the material.

8. In a composition cork compressor, the combination with a mixer, of a series of compressor rolls between which the material is fed and compressed, scraping means coöperating with said rolls to prevent the compressed material clinging to the surfaces of the rolls, means for directing said compressed material downwardly, cutters for cutting the material longitudinally, length-cutting mechanism, means coöperating with said length-cutting mechanism for moving the same laterally across the apparatus, mechanism coöperating with said length-cutting mechanism and the means for moving the same laterally for moving said length-cutting mechanism vertically in the path of an ellipse, its forward movement being contemporaneous with its downward travel and that of the material, and a means of adjustment for adjusting said length-cutting mechanism longitudinally of the apparatus.

9. In a composition cork compressor, the combination with a mixer, of a series of compressor rolls between which the material is fed and compressed, means for directing the compressed material downwardly, length-cutting mechanism, means coöperating with said length-cutting mechanism for moving the same laterally across the apparatus, and mechanism coöperating with said length-cutting mechanism and the means for moving the same laterally for moving said length-cutting mechanism vertically in the path of an ellipse, its forward movement being contemporaneous with its downward travel and that of the material.

10. In a composition cork compressor, the combination with a mixer, of a series of compressor rolls between which the material is fed and compressed, means for directing the compressed material downwardly, length-cutting mechanism, means coöperating with said length-cutting mechanism for moving the same laterally across the apparatus, mechanism coöperating with said length-cutting mechanism and the means for moving the same laterally for moving said length-cutting mechanism vertically in the path of an ellipse, its forward movement being contemporaneous with its downward travel and that of the material, and a means of adjustment for adjusting the said length-cutting mechanism longitudinally of the apparatus.

11. In a composition cork compressor, the combination with a mixer, of a series of compressor rolls between which the material is fed and compressed, means for directing the compressed material downwardly, rotary flanged pulleys, an endless band-knife arranged upon said pulleys, means for operating said pulleys, and means for moving said band-knife vertically in the path of an ellipse, its forward motion being contemporaneous with its downward travel and that of the material for serving the material.

12. In a composition cork compressor, the combination with a mixer, of a series of compressor rolls between which the material is fed and compressed, means for directing the compressed material downwardly, rotary flanged pulleys, an endless band-knife arranged upon said pulleys, means for operating said pulleys, means for moving said band-knife vertically in the path of an ellipse, its forward motion being contemporaneous with its downward travel and that of the material for severing the material, and a means of adjustment for adjusting the said length-cutting mechanism longitudinally of the apparatus.

13. In a composition cork compressor, the combination with a mixer, of a series of compressor rolls between which the material is fed, rotary flanged pulleys, a band-knife arranged upon said pulleys for cutting the compressed material into lengths, means for operating said pulleys for causing said band-knife to move laterally across the apparatus, and means for moving said band-knife in the path of an ellipse, consisting of reciprocatory slides, a driven pulley, a shaft upon which said driven pulley is mounted, a pinion on said shaft, a swinging intermediate gear in mesh with said pinion, a swinging shaft upon which said intermediate gear is fixed, a system of links, a fixed pinion on said swinging shaft, and a pinion 208 in mesh with the fixed pinion on said swinging shaft, a shaft 209 on which said pinion 208 is mounted, a bevel-gear upon said shaft, and a bevel-gear upon the shaft of one of the said rotary flanged pulleys, and means for reciprocally moving said parts vertically.

14. In a composition cork compressor, the combination with a mixer, of a series of compressor rolls between which the material is fed, rotary flanged pulleys, a band-knife arranged upon said pulleys for cutting the compressed material into lengths, means for operating said pulleys for causing said band-knife to move laterally across the apparatus, and means for moving said band-knife in the path of an ellipse, consisting of reciprocating slides, a driven pulley, a shaft upon which said driven pulley is mounted, a pinion on said shaft, a swinging intermediate gear in mesh with said pinion, a swinging shaft upon which said intermediate gear is fixed, a system of links, a fixed pinion on said swinging shaft, and a pinion 208 in mesh with the fixed pinion on said swinging shaft, a shaft 209 on which said pinion 208 is mounted, a bevel-gear upon said shaft, and a bevel-gear upon the shaft of one of the said rotary flanged pulleys, and means for reciprocally moving said parts vertically, consisting of a rotary shaft 176, grooved cams mounted upon said shaft 176, vertically movable slides upon which said reciprocating slides are mounted, and anti-friction rollers connected with said vertically movable slides, said rollers being in engagement with said cams.

15. In a composition cork compressor, the combination with a mixer, of a series of compressor rolls arranged in pairs, rotary flanged pulleys, a band-knife arranged upon said pulleys for cutting the compressed material into lengths, means for operating said pulleys for causing said band-knife to move laterally across the apparatus, and means also coöperating with said band-knife for moving the same vertically in the path of an ellipse.

16. In a composition cork compressor, the combination with a mixer, of a series of compressor rolls arranged in pairs, rotary flanged pulleys, a band-knife arranged upon said pulleys for cutting the compressed material into lengths, means for operating said pulleys for causing said band-knife to move laterally across the apparatus, means also coöperating with said band-knife moving the same vertically in the path of an ellipse, and means of adjustment for adjusting the said band-knife longitudinally of the apparatus.

17. In a composition cork compressor, the combination with a mixer, of a series of compressor rolls arranged in pairs, rotary flanged pulleys, a band-knife arranged upon said pulleys for cutting the compressed material into lengths, means for operating said pulleys for causing said band-knife to move laterally across the apparatus, and means also coöperating with said band-knife for moving the same vertically in the path of an ellipse, consisting of reciprocating slides, a driven pulley, a shaft upon which said driven pulley is mounted, a pinion on said shaft, a swinging intermediate gear in mesh with said pinion, a swinging shaft upon which said intermediate gear is fixed, a system of links, a fixed pinion on said swinging shaft, and a pinion 208 in mesh with the fixed pinion on said swinging shaft, a shaft 209 on which said pinion 208 is mounted, a bevel-gear upon said shaft, and a bevel-gear upon the shaft of one of the said rotary flanged pulleys, and means for reciprocally moving said parts vertically.

18. In a composition cork compressor, the combination with a mixer, of a series of compressor rolls arranged in pairs, rotary flanged pulleys, a band-knife arranged upon said pulleys for cutting the compressed material into lengths, means for operating said pulleys for causing said band-knife to move laterally across the apparatus, and means also coöperating with said band-knife for moving the same vertically in the path of an ellipse, consisting of reciprocating slides, a driven pulley, a shaft upon which said driven pulley is mounted, a pinion on said shaft, a swinging intermediate gear in mesh with said pinion, a swinging shaft upon which said intermediate gear is fixed, a system of links, a fixed pinion on said swinging shaft, and a pinion 208 in mesh with the fixed pinion on said swinging shaft, a shaft 209 on which said pinion 208 is mounted, a bevel-gear upon said shaft, and a bevel-gear upon the shaft of one of the said rotary flanged pulleys, and means for reciprocally moving said parts vertically, consisting of a rotary shaft 176, grooved cams mounted upon said shaft 176, vertically movable slides upon which said reciprocating slides are mounted, and anti-friction rollers connected with said vertically movable slides, said rollers being in engagement with said cams.

In testimony, that I claim the invention set forth above I have hereunto set my hand this 1st day of July, 1912.

ALBERT H. BIERTUEMPFEL.

Witnesses:
FREDK. C. FRAENTZEL,
FREDK. M. W. FRAENTZEL.